INVENTOR.
David H. Thorburn,
BY
Byron, Hume, Groen + Clement

United States Patent Office 3,084,901
Patented Apr. 9, 1963

3,084,901
PRESSURE COMPENSATED VALVE
David H. Thorburn, Oak Park, Ill., assignor to The Powers Regulator Company, Skokie, Ill., a corporation of Illinois
Filed Nov. 17, 1960, Ser. No. 69,996
5 Claims. (Cl. 251—61)

This invention relates to an improved pneumatic control valve of the type used to automatically control fluid flow through a fluid system in response to variations in predetermined external conditions such as the control of the flow of hot water in a hot water heating system in response to the rising and falling temperatures within a room.

In the development of pneumatic control valves responsive to external conditions a major problem has arisen by virtue of the small pressure variations which can be generated by conventional sensing devices for use to perform a controlling function. For example, a thermostatically controlled system will generate control fluid pressure differences of a very minor order in response to temperature variations which small pressure differences must be utilized to control the relatively high fluid pressures in heating systems.

Therefore, it is a primary object of this invention to provide an improved pneumatic control valve including pressure compensated means to effectively utilize small control pressure variations to effectively actuate valving means used in opposition to medium fluid pressures of a relatively high order of magnitude.

Further objects of the instant invention are to provide an improved pneumatic control valve including pressure compensating means between either the upstream or the downstream side of the valve seat to neutralize those forces acting in opposition to valve lifting or movement and thus subject the valving control exclusively to the fluctuation in control fluid pressure to achieve more effective and accurate control; to provide a valving assembly utilizing a minimum number of parts to reduce the expense of manufacture, assembly and repair yet capable of performing with relative precision; and to provide such a valve which is safe and certain in operation during prolonged periods.

Figure 1:
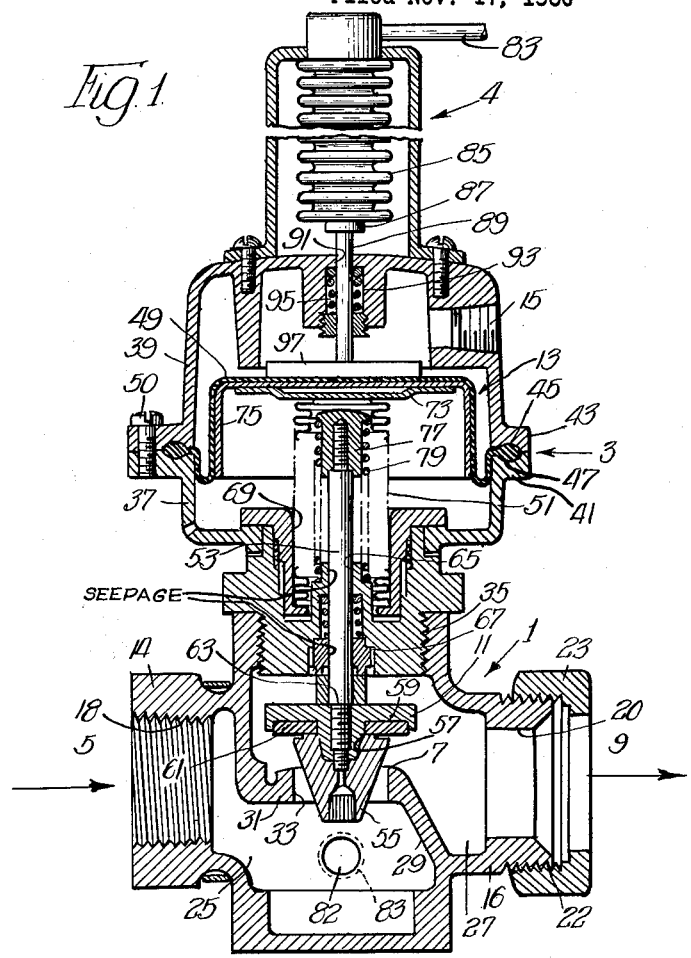
Figure 2:
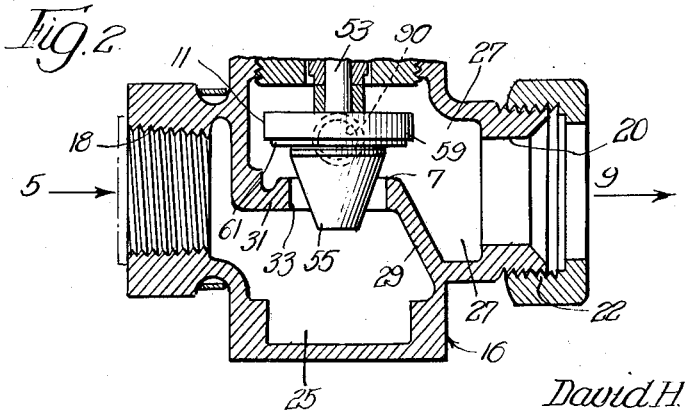

Further objects and advantages will become evident from the more particular description and from the drawings in which:

FIGURE 1 is a side elevational view in cross section of a preferred embodiment of the pressure compensated valve of the instant invention; and FIGURE 2 is a fragmental, side elevational view in cross section of a modified form of the pressure compensated valve of the subject invention.

An understanding of the context in which the instantaneous valve is designed to be used may be helpful in understanding more particularly the working of this pressure compensated valve and the advantages achieved thereby.

An illustration of a typical use would be in a hot water heating system in which the water is heated by some suitable means and forced through a pipe or pipes to a plurality of radiators to heat a given room area. In order to control the temperature of the given area with some degree of accuracy it is necessary to control the flow of hot water through the system. Conventional thermostatic devices are often utilized to sense the temperature in the area to be governed and to translate changes in temperature into changes in control fluid pressures. Because of the inherent limitations of thermostatic devices such control fluid pressures as are generated are invariably on a relatively small order of magnitude, but nevertheless must be effectively utilized to control valving mechanisms subjected to fluid medium forces of a relatively high order of magnitude, which act in opposition to such control forces.

For example, in the instant invention, as shown in FIGURE 1, the hot water, or other heating or fluid medium to be transferred through the system, enters the inlet port 5 and passes through the valving orifice 33 and through the outlet port 9 from which it flows to the heating radiator or other heat transfer device. To control the flow of fluid to the radiator the valve member 11, which may generally be referred to as a closure member, is reciprocated toward and away from the valve seat 7 by means of a diaphragm control assembly 13 which is subjected to the control fluid pressure generated by the thermostat and which enters into the valve through port 15, thus correlating fluid flow with temperature.

As previously noted, the heating or other fluid medium entering inlet port 5 is under a relatively high pressure as compared to the pressure generated by the control fluid and imposed upon the diaphragm apparatus 13. Therefore, the pressure on the valve member 11 resulting from the pressure of the medium exceeds the pressure per square inch to which the diaphragm apparatus 13 will be subjected by the control fluid pressure to control the movement of the valve member. As will be explained in greater detail later on, when the valving element 11 is removed from the seat 7, the valve is subjected to an increase in force depending upon the size of the opening. The increased force is caused by the increase in area exposed to the fluid pressure and the momentum of the fluid passing therebetween. Thus, when the valving element 11 is removed from the valve seat 7 the flow of fluid through and the pressure differential across the orifice 33 and past valve member 11 tends to force the continued movement of the valving element 11 away from the seat to open the orifice beyond that required by the temperature demands indicated by the thermostat and communicated to the control diaphragm. It should be noted that as the valving element 11 moves further and further away from the valve seat, the effect of the pressure drop and the momentum of the fluid is less and less, as will be explained more fully later on.

The valve may be described generally as comprised of a valve body, denoted by the numeral 1, a diaphragm control assembly casing 3, and a compensating bellows housing 4. The valve body 1 is of a conventional type generally cast and provided with aligned oppositely projecting annular studs 14 and 16 which respectively are provided with aligned bores 18 and 20 forming the inlet port 5 and the outlet port 9, respectively. The bore 18 may be threaded so as to receive a complementary threaded nipple or pipe end to receive fluid from the heating or cooling element, as the case may be. The stud 16 may be externally threaded as at 22 to receive a coupling member 23 to permit the securing of a flanged pipe element thereto to convey fluid outwardly toward the heat transfer device.

The interior of the control valve body 1 includes an inlet chamber 25 which is separated from a second or outlet chamber 27 by means of a web 29 which is formed with a central seat base substantially parallel with the axis through the stud members 14 and 16. This central seat base 31 is provided with a bore 33 and a concentric annular projection to define the valve seat 7.

The diaphragm control assembly casing 3 is formed with a lower annular stud 35 externally threaded and received within the upwardly extending internally threaded annular stud of the control valve body. The diaphragm control assembly casing is formed in two parts 37 and 39 each formed with complementary annular outwardly extending flanges 41 and 43, each provided with an annular internal recess 45 and 47 to receive the external circumferential beaded portion of the diaphragm member 49. The bolts 50 are utilized to secure the two parts together.

The internal operating mechanism of the diaphragm control assembly comprises the diaphragm 49, a bellows member 51 and a control stem 53 secured to the valving member 11.

More particularly, the valving member 11 is comprised of a frustro-conical boss 55 the larger diameter of which is slightly less than the diameter of the bore 33. The base of the boss 55 is internally recessed at 57 to receive the protuberance formed on the valving member 11. The valving member 11 is substantially cylindrical having an external diameter in excess of the internal diameter of the bore 33 and of boss 55 and is provided with an annular recess 59 on the underside receiving a valving gasket 61 which extends radially outwardly beyond the boss 55 to provide a seating and sealing relationship with valve seat 7. The assembly of the valving element 11 is accomplished by the progressive diametrically reduced lower portions of the valve stem 53 which provide, first, a shoulder 63 bearing upon the valve element 11 forcing it and gasket 61 firmly against boss 55 which threadedly receives the terminal end of the valve stem 53. The lower end of the boss 55 may be provided with a polygonal or irregularly shaped recess to receive an appropriate tightening tool.

The control stem 53 extends through a bore 65, formed within the lower diaphragm casing 37 concentrically within stud 35, and into the chamber defined by the mating upper and lower casings 37 and 39 and axially divided into two compartments by the diaphragm 49. The bore 65 in the lower casing 37 is provided with appropriate counter bores to receive the spring biased sealing assembly indicated generally at 67 which permits reciprocation of the stem but inhibits the flow of fluid upwardly therealong. The lower diaphragm casing 37 includes a bore 69 axially aligned with and located above the previously described bore 65. An elongated bellows member 51 is received in and is of substantially the same diameter as the counter bore 69 and surrounds the entire upper end of the stem 53 extending into the chamber defined by the upper and lower casings 37 and 39. The lower end of the bellows member 51 is secured adjacent the lower end of the counter bore 69 and extends upwardly where it is attached to the plate 73 secured within the cap member 75 supporting diaphragm 49. The upper extremity of the control rod 53 extends into said bellows and is threadedly received within the boss 77 which is adapted to normally abut the support member 73 for purposes of driving. It will be noted that whereas the valving member 11 is fully open, the boss 77 may be disengaged from the support member 73 as a result of the force of the bellows 51 and the pressure above the diaphragm 49, as shown in FIGURE 1 and as will be explained more fully later on.

Within bellows 51 is an elongated compression spring member 79. The lower portion of spring 79 is seated upon an annular shoulder formed concentrically externally of bore 65 and the upper extremity is seated upon an annular shoulder concentrically formed on the boss 77. The spring 79 biases the diaphragm 49 and consequently the valve element 11 upwardly away from valve seat 7.

From the preceding description it can be seen that fluid will eventually leak past the sealing assembly 67 into the bellows 51 after the valve has been in operation for prolonged periods. The pressure within the bellows 51 will obviously tend to expand it against the force on the diaphragm in conjunction with the spring 70 so that an additional force will be acting to yet further remove the valving element 11 from the valve seat 7 to increase the flow of heating or other fluid medium completely beyond that dictated by the thermostatic control system. Considering the time lag which must occur before the thermostat device will recognize the increased heat, this factor contributes significantly to the disruption of even heating.

In order to compensate for these two major limitations; namely, the necessity that a control pressure force of relatively minor magnitude be utilized to actuate valving controlling a fluid medium having a pressure of a relatively high order of magnitude and the antagonistic force created by seepage along the stem 53 into bellows 51, the instant invention teaches the utilization of two alternate solutions. It will be noted that in valves such as that shown in the drawing, seepage may be built in so that liquid may flow relatively freely along the valve stem into the bellows 51.

In FIGURE 1 a compensation outlet orifice 82 is provided in the valve body portion 1 communicating with the interior of the lower chamber 25 on the upstream side of the valve seat 7. A tube 83 (partially shown) extends from compensation outlet orifice 82 upwardly into the top of the compensating bellows housing 4. An elongated generally cylindrical bellows member 85 is mounted within the compensating housing 4 with the upper end being affixed to the upper end of the housing and the lower end being affixed to the upper cylindrical attachment boss 87 of a second stem 89. The stem 89 extends into the upper casing 39 through a bore 91 which is provided with a counter bore 93 formed internally within the housing to receive the spring biased seal 95 to prevent seepage along the second or compensating control stem 89. The lower end of the compensating control stem 89 is in turn affixed to a control plate 97 which abuts diaphragm 49 and the support member 73 in a manner biasing them downwardly as will be seen hereinafter.

In operation the fluid medium is received through orifice 5 into the inlet chamber 25 from which it normally flows through the annular orifice 33 defined by the valve seat 7 and the downwardly projecting boss 55 into outlet chamber 27, through orifice 9 to the heat transfer element in the room where temperature is to be controlled.

The control fluid enters the control valve through inlet port 15 and occupies that portion of the upper casing 39 which together with diaphragm 49 defines such control chamber. It will be evident that increased pressures through the control fluid line will tend to force the diaphragm 49 downwardly against the force of the compression spring member 79 as viewed in FIGURE 1, forcing the valving element 11 toward the valve seat 7 and the boss progressively into the orifice 33 to diminish the flow therethrough until the valving gasket rests upon the valving seat to terminate all flow therethrough.

Ordinarily, the relatively high pressure within the inlet chamber 25 acting on valving element 11 as a result of the pressure differential or drop between the inlet and outlet chamber sides of said valve seat would tend to resist the downward or closing movement caused by the control pressure fluid acting upon the diaphragm 49. However, in the instant invention the fluid pressure in the inlet chamber 25 is communicated through the orifice 82, tube 83 and into the bellows 85 to exert an equal and opposite force through the stem 91 secured to diaphragm 49. Thus, the only effective force resisting the closing force provided by the control fluid is that provided by the compression spring 79 which tends to bias the valving element 11 away from valving orifice 33.

When the control pressure is reduced in response to thermostatic means so that the pressure within the upper chamber exerts less force on the diaphragm 49 than is exerted on the underside thereof by the compression spring 79, the valve element 11 will move upwardly off seat 7 into a proper position to permit precise metering of fluid flow through valving orifice 33 into the heat transfer device provided to control room temperature. Once again, the equalization of pressures within the inlet chamber 25 and the bellows 85 allows the reduction in control pressure to completely determine the valve element position relative to the valving orifice 33. If no compensation means were used, the initial lifting of the valving element 11 would result in a high pressure differential drop which would tend to jettison the valving element upwardly beyond the indicated position.

Further, in such pneumatic control valves it is not unusual, particularly during a long winter season, for the valving element 11 to permit constant fluid flow from the inlet chamber 25 through the valving orifice 33 and thus allow the attainment of a relatively constant pressure within the outlet chamber 27. As a result, the constant pressure within the outlet chamber 27 eventually causes sufficient seepage upwardly along the valve stem 53 past the spring biased sealing means 67 and into the interior of the sealing and expansible bellows 51 to fill the bellows with the fluid. When this happens, the fluid within the bellows 51 exerts a pressure upwardly on the diaphragm 49 in opposition to the control pressure forces operating on the other side of said diaphragm in the opposite direction, as mentioned previously.

Without any compensating means, as taught by the instant invention, this would mean that the control pressure forces acting on the upper side of diaphragm 49 would be acting in direct opposition and would have to overcome the sum of the forces provided by the pressure force on the valving element 11, the force provided by the compression spring 79 and the force within the bellows 51. Since the control pressure forces are of relatively small magnitude as compared to the opposing forces, the latter induces intolerable error into the operation of the valve.

It is to be noted that the pressure drop effect on the valve varies with the degree of opening. For example when the valve is closed the total force on the valve will be the projected area of the aperture 33 times the liquid pressure. As the valve is cracked open the exposed area is increased to that defined by the element 11. Since the pressure drop remains substantially the same as when closed, the force of the valve suddenly increases by the amount of the area increase. If the difference between the exposed area when closed and when open is substantial, then the increase in force may be sufficient to cause the valve to assume an open position much greater than indicated by the control fluid. As the valve is spaced further and further from the valve seat the pressure drop diminishes in most valves until it becomes negligible.

The pressure in the bellows 51 on the other hand tends to reflect the pressure on the downstream side of the valve, although there may be a slight time lag, due to the sealing assembly, between it and the chamber 27. The pressure in chamber 27, when the valve is closed, will be substantially zero. As the valve is opened the pressure in the chamber 27 increases, which in turn causes a corresponding pressure increase in the bellows 51. Thus as the pressure drop across the valve element 11 decreases, the pressure in bellows 51 increases.

It can be seen that there is an inverse relationship between the force on the valve element 11 and the pressure within the bellows 51. As a result of the inverse relationship it may be possible to select compensating bellows 85, valve 11 and bellows 51 of sizes and designs so that the former will substantially compensate for the pressure effects generated by the latter two for at least a predetermined range of the valve 11.

In the modification of the instant invention shown in FIGURE 2 the compensating orifice 90 is positioned in the outlet chamber 27 adjacent the valving element 11. Since the modification in FIGURE 2 is identical in construction with that shown in FIGURE 1, except for the position of the orifice 90, like parts will be designated with like numbers and the full structural description will not be repeated. This, then, serves to produce a pressure within the compensating bellows 85 substantially identical to the pressure created within the bellows 51 due to seepage from the outlet chamber 27 along stem 53 into said bellows. This latter modification thus compensates entirely for the pressure created in the bellows 51 by seepage, whereas the embodiment shown in FIGURE 1 utilizing the higher pressure occasioned within the inlet 25 serves to compensate both for the pressures within the bellows 51 and the forces acting upon the valving element 11 in opposition to the control fluid forces acting on the upper surfaces of diaphragm 49.

It can be seen that the second embodiment is especially suited for valves in which the pressure drop effect is relatively insignificant. One instance where the pressure drop is insignificant is in systems which require the valves to be opened a substantial degree for prolonged periods of time, if not for the entire operation of the system. One such system would be a hot water heating system in which the room temperature is consistently maintained at some predetermined temperature.

As was mentioned previously, once the valve is opened a significant amount, the effect of the pressure drop is negligible so that the only significant force acting on the valve outside of the spring is the pressure within the bellows 51, which would be counter balanced by the pressure within the bellows 85.

Therefore, from the foregoing description it can be seen that an improved pneumatic control valve has been provided which includes pressure compensated means to more effectively utilize small control pressure variations to effectively actuate valving means which must often move in opposition to medium fluid pressures of a relatively high order of magnitude; which pressure compensating means may utilize pressures on either the upstream side of the valve seat to neutralize not only the forces acting upon the valving element, but also those resulting from seepage along the valve stem, and acting in opposition to valve lifting or movement, and also may be simply adapted to utilize the pressure on the downstream side of the valve seat to neutralize only the forces occasioned by seepage and acting in opposition to valve lifting or movement, and in either event subjecting the valving control more exclusively to the fluctuations in control fluid pressure in order to achieve more effective and accurate control; and which provides a valving assembly utilizing the most effective arrangement of parts to achieve relative precise fluid control yet utilizing a minimum number of elements to reduce the expense of manufacture, assembly and repair to increase the safety and certainty in operation during prolonged periods of use.

Although specific forms of the invention have been disclosed in this specification, it is to be understood that these are merely by way of example and not to be construed as limitations. It will be apparent that certain modifications will be made within the scope of the claims without departing from the spirit of the invention.

It is claimed:

1. A pneumatically operated valve comprising a body assembly defining an inlet chamber and an outlet chamber separated by a partition having a valving orifice therein, a control chamber partially defined by said body assembly and completed by a diaphragm, a valving element for controlling fluid flow through said orifice, said valving element including a closure member adapted when in a closed position to seat on said partition so that a portion thereof overlies said partition and the remaining portion thereof overlies said orifice, a stem mounted for reciprocation wihtin said assembly and having one end secured to said valving element within said outlet chamber and the other end secured for axial movement within said diaphragm, an axially expandable bellows enclosing a portion of the length of said stem, said bellows constituting sealing means between said stem and said assembly and adapted to receive the pressure in one of said chambers, a compression spring surrounding said stem within said bellows urging said valving element away from said orifice, and a pressure compensating means comprising a second bellows expandable axially of said stem, said second bellows and said diaphragm being connected for movement in unison, and means for communicating the pressure in one of said chambers adjacent said valving orifice to said second bellows, in which the force generated by said second bellows offsets at least a substantial part of the force generated by the pressure against said portion of said closure member and of the pressure of said first bellows.

2. A pneumatically operated valve comprising a body assembly including a first chamber having an inlet port for receiving fluid under pressure and a partition having a valving orifice therein, a second chamber partially defined by said body assembly and completed by a diaphragm, a control pressure inlet port in that portion of said assembly partially defining said second chamber, a valving element for controlling fluid flow through said orifice, said valving element including a closure member adapted when in the closed position to seat on said partition so that a portion thereof overlies said partition and the remaining portion overlies said orifice, a stem mounted for reciprocation within said assembly and having one end secured to said valving element and the other end adapted to move with said diaphragm, an axially expansible bellows secured to said assembly and enclosing the other end of said stem to constitute a seal therebetween, said bellows being adapted to receive the pressure downstream from said valving orifice, spring means within said bellows urging said element away from said orifice, and a pressure compensating means comprising a by-pass element having one end in communication with said first chamber, a second axially expansible bellows in communication with the other end of said by-pass means, and a second stem secured axially to said second bellows and extending into said second chamber and terminating in plate positioned on said diaphragm for movement in unison therewith, in which the force generated by said second bellows offsets the force generated by the pressure in said portion of said closure member and by said first bellows.

3. A pneumatically operated valve comprising a body assembly defining an inlet chamber and an outlet chamber separated by a partition having a valving orifice therein, a control chamber partially defined by said body assembly and completed by a diaphragm, a control pressure inlet port in that portion of said assembly partially defining said control chamber, a valving element for controlling fluid flow through said orifice, said valving element including a closure member adapted when in the closed position to seat on said partition so that a portion thereof overlies said partition and the remaining portion thereof overlies said orifice, a stem mounted for reciprocation within said assembly and having one end secured to said valving element and the other end connected to said diaphragm for axial movement therewith, a first bellows secured to said assembly and completely enclosing the other end of said stem and being axially expandable in response to reciprocation of said stem, said first bellows constituting a seal between said assembly and said stem and adapted to receive the pressure in said outlet chamber, and a pressure compensating means comprising a second bellows expandable axially of said stem, a means for communicating the fluid pressure in said outlet chamber to said second bellows, and a second stem having one end secured to said bellows and the other end extending axially from said bellows and connected to said diaphragm to move in unison therewith, in which the effective area of said second bellows is substantially equal and opposite to that of said first bellows and said portion of said closure member.

4. A pneumatically operated valve comprising a body assembly defining an inlet chamber and an outlet chamber separated by a partition having a valving orifice therein, a control chamber partially defined by said body assembly and completed by a diaphragm, a control pressure inlet port in that portion of said assembly partially defining said control chamber, a valving element for controlling fluid flow through said orifice, said valving element including a closure member adapted when in closed position to seat on said partition so that a portion thereof overlies said partition and the remaining portion overlies said orifice, a stem mounted for reciprocation within said assembly and having one end secured to said valving element and the other end connected to said diaphragm for axial movement therewith, a bellows secured to said assembly and enclosing the other end of said stem and being axially expandable in response to reciprocation of said stem, said bellows constituting a seal between said assembly and said stem and adapted to receive the pressure in said outlet chamber, and a pressure compensating means comprising a second bellows expandable axially of said stem, a means for communicating the fluid pressure in said inlet chamber to said second bellows, and a second stem having one end secured to said bellows and the other end extending axially from said bellows and abutting said diaphragm to move in unison therewith, in which the force generated by said second bellows substantially offsets the force of the pressure against said portion of said closure member and against said first bellows.

5. A pneumatically operated valve comprising a body assembly including a first chamber having an inlet port for receiving fluid under pressure, said first chamber being partially defined by a partition having a valving orifice therein, a second chamber partially defined by said body assembly and completed by a diaphragm, a control pressure inlet port in said assembly partially defining said second chamber, a valving element for controlling fluid flow through said orifice, said valving element including a closure member adapted when in the closed position to seat on said partition so that a portion thereof overlies said partition and the remaining portion overlies said orifice, a stem mounted for reciprocation within said assembly and having one end secured to said valving element and the other end mounted for movement with said diaphragm, an expansible sealing means completely surrounding the other end of said stem and adapted to receive the pressure on the downstream side of said valving orifice, and a pressure compensation means comprising an axially expansible chamber means secured to said diaphragm for movement in unison, and means for communicating the pressure in said first chamber so said expansible chamber means, in which the force generated by said expansible chamber substantially offsets the force of the pressure against said portion of said closure member and said expansible sealing means.

References Cited in the file of this patent

UNITED STATES PATENTS 2,365,650     Shaw  ---------------- Dec. 19, 1944
2,931,616     White  ---------------- Apr. 5, 1960